Feb. 8, 1944.  H. C. EASTER  2,340,944
INSECT ELIMINATOR
Filed Sept. 2, 1941

INVENTOR
Harry C. Easter
BY Alfred R. Fuchs
ATTORNEY

Patented Feb. 8, 1944

2,340,944

UNITED STATES PATENT OFFICE 2,340,944

INSECT ELIMINATOR

Harry C. Easter, Kansas City, Mo.

Application September 2, 1941, Serial No. 409,233

13 Claims. (Cl. 43—139)

My invention relates to insect eliminators, and particularly to a device for catching and destroying insects.

It is a purpose of my invention to provide a device for eliminating insects that comprises means for creating a current of air, or stream of air, that will draw the insects into a cutting and disintegrating device, to disintegrate the same, and to provide means for receiving and holding the disintegrated insects while permitting the air to pass therethrough.

It is a further purpose of my invention to provide a device of the above mentioned character that is simple in construction and which is portable, so that the same can be readily transported from place to place, and which is so constructed that the destroyed insect catching or holding means can be removed and emptied whenever this is found to be necessary or desirable.

My invention further comprises a nozzle, or similar means, which can be placed in proximity to the insects to draw the same into the device by means of the current of air above referred to, and which may be so mounted that the same can be engaged with a nest, or similar place, in which the insects may be located, so that the same can be drawn from the nest, or similar place, into the device and destroyed.

My invention further comprises means for preventing any particles of the disintegrated insects from escaping from the device, comprising outlet means having filter means associated therewith for filtering the air that is discharged from the device before entering said outlet.

It is a particular purpose of my invention to provide a device of the above mentioned character, comprising a casing in which is mounted means for rotating a shaft that is provided with means for creating the stream or current of air referred to, and which carries rotatable cutter means for disintegrating the insects, said shaft passing through a wire, or similar, foraminous basket, and said cutter member being located at the open inlet end of said basket, so that the stream of air will draw the insects into the disintegrating or cutting device, and then carry the disintegrated insects into the basket member to accumulate therein, the air passing through the openings in the basket-like member and on through the filter out of the casing. Said device further, preferably, comprises means for detaching a portion of the casing having an inlet connection thereon with which the nozzle is connected, and a detachable connection between two shaft portions, the one shaft portion extending through the basket-like member and carrying the disintegrating means and being removable from the other shaft portion after the detachable portion of the casing has been removed, thus permitting ready removal of the basket and emptying thereof to put the device in condition for further destroying additional insects.

The device is particularly adapted for catching and destroying flies, bees, wasps, and other insects, that are found to be troublesome, or annoying, being particularly adapted for catching and destroying flying insects of various sorts.

Other objects and advantages of my invention will appear as the description of the drawings proceeds. I desire to have it understood, however, that I do not intend to limit myself to the particular details shown or described, except as defined in the claims.

Figure 1:
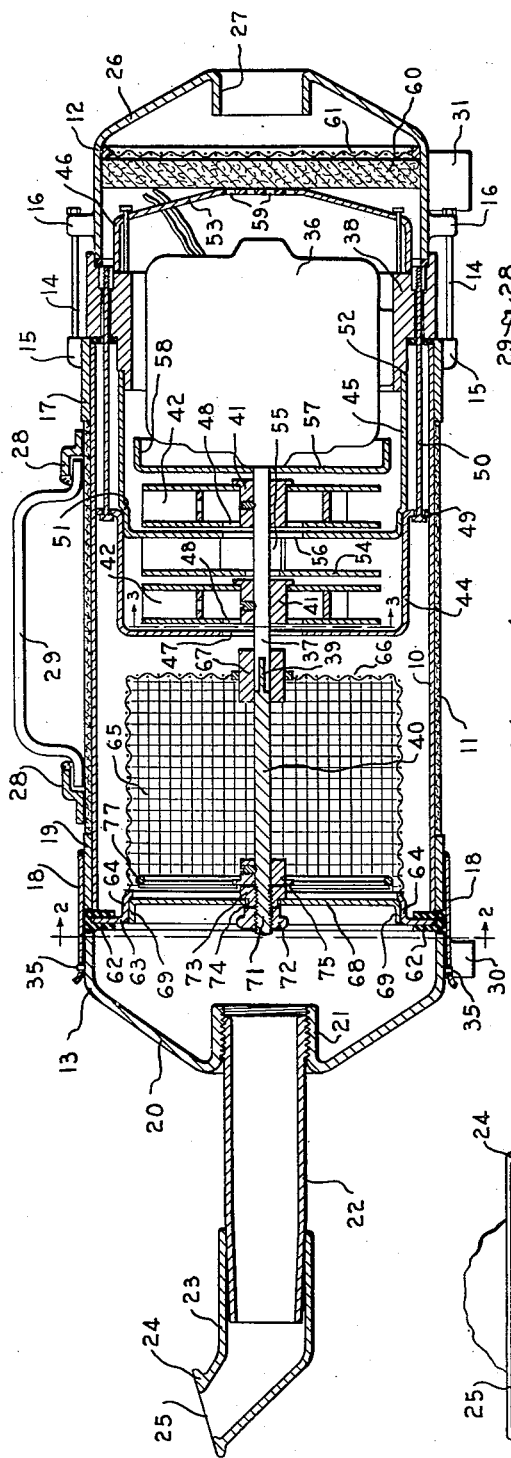
Fig. 1 is a longitudinal sectional view, partly in elevation, of my improved insect eliminator.
Figure 2:
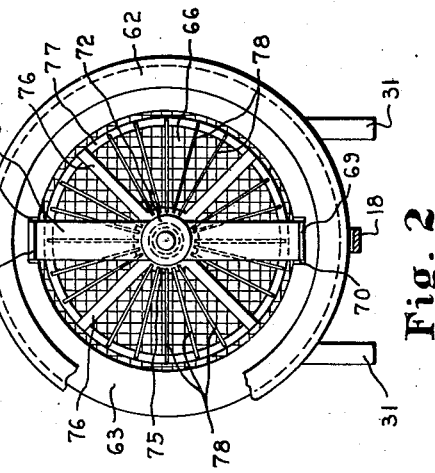
Fig. 2 is a section taken on the line 2—2 of Fig. 1.
Figure 3:
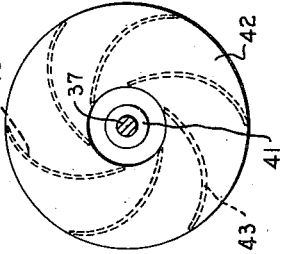
Fig. 3 is a section taken on the line 3—3 of Fig. 1.
Figure 4:
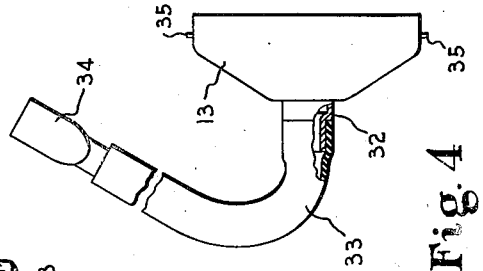
Fig. 4 is a fragmetary view partly in elevation and partly in section, showing a modified form of inlet connection and nozzle.
Figure 5:
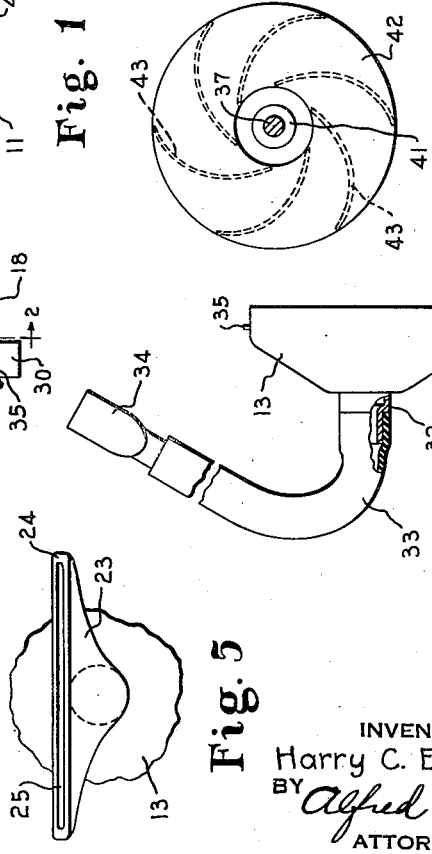
Fig. 5 is a fragmentary end elevational view of the nozzle and nozzle carrying end of the insect eliminator.

Referring in detail to the drawing, my insect eliminator comprises a casing comprising a tubular body portion having an inner cylindrical wall portion 10 and an outer cylindrical wall portion 11, and end members 12 and 13 that are detachably connected to the body portion. Said detachable connection may be made in any manner, as by means of the headed fastening elements 14 engaging the lugs 15 and 16 on a ring-like member 17 secured to said tubular body portion and to the end member 12, respectively, and the spring fingers 18 secured to the ring like member 19 and snapping over lugs 35 on the end member 13 that are received in openings in said resilient members 18, said ring-like member 19 being secured to the tubular body portion of the casing.

The end member 13 is provided with a conical end wall 20, which terminates in an iwardly directed tubular portion 21 that is internally threaded to receive the inlet connection 22 screwthreadedly, said inlet connection 22 having a nozzle member 23 mounted thereon, which terminates in a wide nozzle portion 24 having a slotlike opening 25 therein, that is, said opening 25 is long and narrow.

The end member 12 is provided with a conical wall portion 26, which terminates in an inwardly directed tubular member 27 serving as an outlet connection from the interior of the chamber within the casing. A pair of bracket members 28 are provided on the tubular body portion for securing the handle member 29 thereto. Feet 30 and 31 may be provided on the end members 13 and 12, respectively, for supporting the casing on any suitable object in a position with its longitudinal axis substantially horizontal.

Instead of providing the inlet connection 22 on the end member 13, the inlet connection 32 may be provided, which is provided with a flexible tubular member 33, secured thereto in fluid tight relation, and which terminates in a nozzle 34, which may be at any desired distance from the device, dependent upon the length of the flexible tubular member 33. The opening in the nozzle 34 is, preferably, of a wider character than in the slot 25 and can be used for sucking insects out of nests, or similar places.

Within the casing is a motor 36, which has a shaft 37 extending therefrom. Said motor is mounted in fixed position on a ring-like member 38, which is clamped between the tubular main body portion of the casing and the end member 12, by the bolt-like members 14. The shaft 37 is transversely slotted at its extremity to receive a reduced flat faced projection 39 on the shaft portion 40, the shaft portions 40 and 37 being thereby detachably connected together to rotate in unison. Fixed to the shaft portion 37 are the hub portions 41 of a pair of rotatable impeller members 42, which are provided with blades 43 to create a current of air toward the outlet 27, thus serving substantially as exhaust fans.

Said impeller members are mounted within a casing made up of the members 44, 45 and 46. The member 44 has a central opening 47, through which the shaft 37 extends, and which aligns with an opening 48 in one of the impeller members, and is provided with an outwardly directed flange 49 which receives the headed securing members 50, said flange seating against an annular shoulder at 51 on the member 45, said member 45 being of a cup-like character and having the edge portion of its open end seated against an annular shoulder 52 on the ring-like member 38. The securing elements extend through the flange 49 and through the conical end wall 53 of the housing member 46, to thus secure the members 44, 45 and 46 in fixed position on the ring-like member 38.

A baffle plate 54 is secured in spaced relation to the member 45 by means of connecting webs 55 to direct the stream of air discharged from the periphery of the first impeller member 42 into the central opening 56 in the end wall of the member 45 and through the central opening 48 in said second impeller 42, where the air is again discharged peripherally from the impeller 42 and passes around the baffle plate 57 having a peripheral flange 58, and between the motor 36 and the ring-like member 38, and finally out through a multiplicity of openings 59 provided in the end wall 53 of the member 46.

Between said openings 59 and the discharge outlet 27 is mounted suitable filtering means comprising a pad-like filtering member 60 and a screen 61, the pad-like member 60 and the screen 61 cooperating to prevent the discharge of any particles that might be passing through the device with the stream of air out through the outlet 27.

Mounted between the end member 13 and the ring-like band 19 on the central body portion of the casing is a compressible gasket member 62, which is substantially U-shaped in cross section, providing a groove receiving the outwardly directed flange 63 on a ring-like member 64, which forms the peripheral support for one end of a wire screen basket-like member 65, which has a substantially cylindrical side wall and an end wall 66 that extends substantially perpendicular to the shafts 37 and 40, said end wall 66 having an opening in the center thereof, in which is mounted a bearing member 67, which is secured in fixed position to said wall 66 in any suitable manner, and which serves to center said basket on the shaft 37 and to aid in aligning the shaft 40 with the shaft 37, and to couple said shafts together by means of the tongue, or projection, and groove, or slot, previously referred to. The basket-like member having the foraminous or reticulated wall is thus detachably mounted between the end member 13 and the main body portion of the casing, and said basket-like member and the gasket member 62 are removable together as a unit from the casing when the member 13 is detached from the casing.

Mounted within the ring-like member and extending diametrically across the same is a bar 68 having end flanges 69 that are seated in notches or recesses 70 in the ring-like member 64. The shaft portion 40 has a screw-threaded end portion 71, upon which a pair of nuts 72 and 73 are mounted, which have reduced portions facing each other, as will be evident from Fig. 1, providing a groove between the same at 74, the bar 68 being provided with an opening of substantially the size of the reduced end portion on the nut 73, for receiving said reduced end portion therein, thus providing a bearing for the shaft portion 40 in the bar 68 at this opening. It will be obvious that the bar 68 can be removed by unscrewing the nut 72, whereupon the entire shaft portion 40 and all parts carried by it can be removed from the basket member 65 and the contents of the basket member can be readily emptied.

Fixed on the shaft 40 is the hub portion 75 of a disintegrator member, which is provided with a plurality of spokes 76 extending to the rim portion 77, a plurality of cutter blades in the form of wires 78 being provided, which extend between the hub and the rim of the disintegrator member. Said disintegrator member is fixed on the shaft to rotate therewith and will rotate at the same speed as the motor and as the two impeller members 42.

In operation the nozzle 25 or the nozzle 34 is brought into proximity with the insect, or group of insects, or nest, or other place, in which the insects may be located, that are to be destroyed, and with the motor 36 operating, a very strong draft of air is created by the impeller members 42 in through the nozzle 25 or 34, as the case may be, through the inlet connection 22 or 32, into the interior of the casing at the end member 13 and then past the bar 68 parallel to the axis of the shaft 40, through the rapidly rotating disintegrator member, and then through the walls of the basket to the opening 47 in the first impeller member 42, and around the baffle 54 through the opening 56 in the end wall of the member 45, and through the opening 48 in the second impeller member 42, and thence around the motor through the openings 59, filter members 60 and 61, and through the discharge outlet 27. This current of air will carry insects, particularly any flying insect, rapidly in through the nozzle and inlet connection and into engagement with the rapidly rotating cutter bars 78 of the disintegrator member, where the insects are thrown about and cut up into small parts and thus effectively destroyed.

The disintegrated or broken up insects are collected in the basket member 65 and can collect therein until such a large quantity thereof accumulates in the basket that the air will not readily pass through the reticulated or foraminous walls of the basket, whereupon the basket has to be emptied by removing the end member 13 and the basket and associated parts, as previously described. The air, upon passing through the fine mesh wire walls of the basket, will be cleared of all insect parts and will pass as substantially clean air through the impeller members and through the openings 59. Should, however, fine particles of dust or parts of insects escape through the mesh of the wire, the same will be prevented from passing out through the outlet, by the filter means made up of the members 60 and 61.

What I claim is:

1. An insect eliminator comprising a foraminous container having an open end, a rotary insect destroying member mounted in said open end of said container, a nozzle and means for drawing a stream of air into said nozzle and directing said stream of air axially through said destroying member and said container, comprising a housing into which said nozzle leads enclosing said container, and suction creating means in said housing in axial alignment with said nozzle beyond the end of said container opposite said open end, the walls of said container being interposed between said suction creating means and said destroying member.

2. An insect eliminator comprising a foraminous container having an open end, a rotary insect destroying member comprising a hub, a rim, spokes connecting said hub and rim and cutter blades extending between and fixed to said hub and rim mounted in said open end of said container, means for projecting insects into said rotary destroying member and depositing the destroyed insects in said container.

3. An insect eliminator comprising a casing having an inlet connection at one end thereof, a nozzle on the end of said connection, said casing having an outlet at the other end thereof, said casing being otherwise closed, a shaft extending lengthwise of said casing, means for rotating said shaft, means on said shaft for creating a current of air lengthwise through said casing from said inlet connection to said outlet, a wire basket mounted in said casing between said inlet connection and said draft creating means, and having an open end adjacent said inlet connection, and rotary cutting means on said shaft at said open end of said basket.

4. An insect eliminator comprising a casing having an inlet connection at one end thereof, a nozzle on the end of said connection, said casing having an outlet at the other end thereof, a shaft extending lengthwise of said casing, means for rotating said shaft, means on said shaft for creating a current of air through said casing from said inlet connection to said outlet, a wire basket mounted in said casing between said inlet connection and said draft creating means and having an open end adjacent said inlet connection, said shaft extending longitudinally through said basket, and rotary cutting means on said shaft at said open end of said basket.

5. An insect eliminator comprising a casing having a removable end portion having an inlet connection at one end thereof, a nozzle on the end of said connection, said casing having an outlet at the other end thereof, a shaft extending lengthwise of said casing, means for rotating said shaft, means on said shaft for creating a current of air through said casing from said inlet connection to said outlet, a wire basket mounted in said casing between said inlet connection and said draft creating means and having an open end adjacent said inlet connection, said shaft extending longitudinally through said basket, and rotary cutting means on said shaft at said open end of said basket, said shaft comprising a pair of detachably connected portions, one of which is removable from said casing with said basket upon removal of said end portion of said casing.

6. An insect eliminator comprising a casing having an inlet connection at one end thereof, a nozzle on the end of said connection, said casing having an outlet at the other end thereof, a shaft extending lengthwise of said casing, means for rotating said shaft, means on said shaft for creating a current of air through said casing from said inlet connection to said outlet, a wire basket mounted in said casing between said inlet connection and said draft creating means and having an open end adjacent said inlet connection, rotary cutting means on said shaft at said open end of said basket, and air filter means within said casing between said draft creating means and said outlet.

7. An insect eliminator comprising a casing having an inlet connection at one end thereof, a shaft extending lengthwise of said casing, means for rotating said shaft, means on said shaft for creating a current of air through said casing from said inlet connection lengthwise thereof, a wire basket mounted in said casing between said inlet connection and said draft creating means and having an open end adjacent said inlet connection, said shaft extending longitudinally through said basket, and rotary cutting means on said shaft at said open end of said basket.

8. An insect eliminator comprising a casing having a removable end portion having an inlet connection at one end thereof, a shaft extending lengthwise of said casing, means for rotating said shaft, means on said shaft for creating a current of air through said casing from said inlet connection lengthwise thereof, a wire basket mounted in said casing between said inlet connection and said draft creating means and having an open end adjacent said inlet connection, said shaft extending longitudinally through said basket, and rotary cutting means on said shaft at said open end of said basket, said shaft comprising a pair of detachably connected portions, one of which is removable from said casing with said basket upon removal of said end portion of said casing.

9. An insect eliminator comprising a casing having an inlet connection at one end thereof and having an outlet at the other end thereof, a shaft extending lengthwise of said casing, means for rotating said shaft, means on said shaft for creating a current of air through said casing from said inlet connection to said outlet, a wire basket mounted in said casing between said inlet connection and said draft creating means and having an open end adjacent said inlet connection, rotary cutting means on said shaft at said open end of said basket, and air filter means within said casing between said draft creating means and said outlet.

10. An insect eliminator comprising a casing having a removable end portion having an inlet connection at one end thereof, a shaft extending lengthwise of said casing, means for rotating said shaft, means on said shaft for creating a current of air through said casing from said inlet connection lengthwise thereof, a wire basket mounted in said casing between said inlet connection and said draft creating means and having an open end adjacent said inlet connection, said shaft extending longitudinally through said basket, a bearing support extending across the open end of said basket, a bearing for said shaft mounted on said support, and rotary cutting means on said shaft at said open end of said basket, said shaft comprising a pair of detachably connected portions, one of which is removable from said casing with said basket upon removal of said end portion of said casing.

11. An insect eliminator comprising a casing having a removable end portion having an inlet connection at one end thereof, a shaft extending lengthwise of said casing, means for rotating said shaft, means on said shaft for creating a current of air through said casing from said inlet connection lengthwise thereof, a wire basket mounted in said casing between said inlet connection and said draft creating means and having an open end adjacent said inlet connection, said shaft extending longitudinally through said basket, a bearing mounted on the end of said basket opposite said open end, and rotary cutting means on said shaft at said open end of said basket, said shaft comprising a pair of detachably connected portions, one of which is removable from said casing with said basket upon removal of said end portion of said casing and extends into said bearing and the other of which extends from said draft creating means and is slidably received in said bearing, said shaft portions having inter-engaging means thereon providing a driving connection therebetween.

12. An insect eliminator comprising a casing providing a chamber, a container having foraminous walls detachably mounted in said chamber, said container being open at one end thereof and having a foraminous wall at the other end thereof, a nozzle, an inlet connection leading from said nozzle into said chamber in alignment with the open end of said container, rotating means in said chamber beyond the foraminous end wall of said container for creating a stream of air entering said nozzle and passing through said inlet connection and the walls of said container into said chamber, and disintegrating means mounted in said open end of said container in the stream of air entering said container.

13. An insect eliminator comprising a casing providing a chamber, a container having foraminous walls detachably mounted in said chamber, said container being open at one end thereof, a nozzle, an inlet connection leading from said nozzle into said chamber in alignment with the open end of said container, rotating means in said chamber for creating a stream of air entering said nozzle and passing through said inlet connection and the walls of said container into said chamber, said foraminous wall being interposed between said means for creating the stream of air and said inlet connection to prevent insects from coming into engagement with said means for creating the stream of air, rotating disintegrating means mounted in said open end of said container in the stream of air entering said container, and means for rotating said disintegrating means and said means for creating the stream of air, said disintegrating means being detachably mounted in said chamber to permit removal of said container from said chamber.

HARRY C. EASTER.